(12) United States Patent
Ooga et al.

(10) Patent No.: US 8,739,619 B2
(45) Date of Patent: Jun. 3, 2014

(54) AIR FLOW MEASURING DEVICE HAVING PREVENTIVE MEASURES OF PREVENTING TEMPERATURE SENSOR FROM DAMAGE DURING INSERTION

(75) Inventors: Takashi Ooga, Kariya (JP); Tomoyuki Takiguchi, Okazaki (JP)

(73) Assignee: Denso Corporation, Kariya (JP)

( * ) Notice: Subject to any disclaimer, the term of this patent is extended or adjusted under 35 U.S.C. 154(b) by 178 days.

(21) Appl. No.: 13/556,506

(22) Filed: Jul. 24, 2012

(65) Prior Publication Data
US 2013/0028288 A1 Jan. 31, 2013

(30) Foreign Application Priority Data
Jul. 27, 2011 (JP) .................................. 2011-164784

(51) Int. Cl.
*G01F 1/68* (2006.01)

(52) U.S. Cl.
USPC ...................................... 73/204.22; 73/202.5

(58) Field of Classification Search
None
See application file for complete search history.

(56) References Cited

U.S. PATENT DOCUMENTS

2003/0209068 A1  11/2003  Yonezawa
2011/0088464 A1   4/2011  Ariyoshi et al.

FOREIGN PATENT DOCUMENTS

| JP | 1-206223    | 8/1989  |
| JP | 2003-329495 | 11/2003 |
| JP | 2010-185793 | 8/2010  |
| JP | 2011-085542 | 4/2011  |

OTHER PUBLICATIONS

Office Action (2 pages) dated May 7, 2013, issued in corresponding Japanese Application No. 2011-164784 and English translation (2 pages).

*Primary Examiner* — Harshad R Patel
(74) *Attorney, Agent, or Firm* — Nixon & Vanderhye PC

(57) ABSTRACT

An air flow measuring device includes a fitted part, a housing, a flow sensor, and a temperature sensor component. A projection shape of the fitted part onto an imaginary plane is a first circle. On the imaginary plane, a first point and a second point are located on the first circle or inward of the first circle, and a third point is located inward of the first circle. A diameter of an imaginary circle passing through the first, second, and third points is larger than a diameter of the first circle. The first, second, and third points have such a positional relationship that, when at least one of the first and second points comes into contact with an inner peripheral surface of an attachment hole at time of insertion of the housing into a duct, the third point is away from the inner peripheral surface of the attachment hole.

3 Claims, 7 Drawing Sheets

MAINSTREAM

<u>PRIOR ART</u>

AIR FLOW MEASURING DEVICE HAVING PREVENTIVE MEASURES OF PREVENTING TEMPERATURE SENSOR FROM DAMAGE DURING INSERTION

CROSS REFERENCE TO RELATED APPLICATION

This application is based on Japanese Patent Application No. 2011-164784 filed on Jul. 27, 2011, the disclosure of which is incorporated herein by reference.

TECHNICAL FIELD

The present disclosure relates to an air flow measuring device that includes a bypass flow passage which takes in a part of air flowing through inside a duct and measures an air flow rate by a flow sensor disposed in the bypass flow passage.

BACKGROUND

Conventionally, as illustrated in FIG. 7, for an air flow measuring device 100, there is proposed a device that includes a housing 102 that defines a bypass flow passage which takes in a part of air (mainstream) flowing inside a duct 101, and a temperature sensor component 103 for measuring temperature of intake air flowing inside the duct 101 outside the housing 102. The air flow measuring device 100 includes a fitted part 107 fitted into an attachment hole 106, and the device 100 further includes the housing 102 and the temperature sensor component 103 which extend on one end side of the fitted part 107. The temperature sensor component 103 includes a terminal 108 extending on the one end side of the fitted part 107, and a temperature detecting element 109 electrically connected to the terminal 108.

The air flow measuring device 100 is set by being inserted into the duct 101 through the attachment hole 106. The one end side is a front end side of the device 100 in an insertion direction at the time of the insertion of the air flow measuring device 100 into the duct 101 through the attachment hole 106. A connector part 111 projecting out of the duct 101 is provided on the other end side of the fitted part 107. Therefore, the air flow measuring device 100 is inserted into the attachment hole 106 from the other end side, and as a result, the device 100 is set on the duct 101, with the fitted part 107 fitted into the attachment hole 106 and the connector part 111 projecting outward of the duct 101.

At the time of the insertion of the housing 102 into the duct 101, the temperature sensor component 103 (the temperature detecting element 109 and the terminal 108) may be brought into contact with the duct 101, and the temperature sensor component 103 may thereby be damaged. Accordingly, technologies of providing a protection member 112 around the temperature sensor component 103 or around the temperature detecting element 109 are proposed for a technology for preventing the contact of the temperature sensor component 103 with the duct 101. See JP-A-2010-185793 and JP-A-2011-085542 corresponding to US2011/0088464A1.

However, most protection members 112 project outward of the housing 102, and with respect to the mainstream in the duct 101, the protection member 112 becomes an obstacle projecting into a passage of the duct 101. Consequently, a pressure loss of the mainstream may be increased.

SUMMARY

According to the present disclosure, there is provided an air flow measuring device adapted to be attached to a duct in which air flows. The device includes a fitted part, a housing, a flow sensor, and a temperature sensor component. The fitted part is fitted into an attachment hole which is formed through a pipe wall of the duct. The housing extends from the fitted part to inside of the duct and includes a bypass flow passage which takes in a part of air flowing in the duct. The device is attached to the duct as a result of insertion of the housing into the duct through the attachment hole. The flow sensor is disposed in the bypass flow passage and configured to measure a flow rate of air. The temperature sensor component includes a terminal and a temperature detecting element. The terminal is provided for the housing. The temperature detecting element is connected to the terminal and configured to detect temperature of air flowing in the duct outside the housing. Provided that a plane that is perpendicular to a direction in which the housing extends in a vicinity of the temperature detecting element is an imaginary plane, a projection shape of the fitted part onto the imaginary plane is a first circle; on the imaginary plane, an upstream end of the housing in a flow direction of air in the duct is a first point, a downstream end of the housing in the flow direction is a second point, and a point on the temperature sensor component that is the farthest from a center of the first circle is a third point; on the imaginary plane, the first point and the second point are located on the first circle or inward of the first circle, and the third point is located inward of the first circle; a diameter of an imaginary circle passing through the first point, the second point, and the third point is larger than a diameter of the first circle; and the first point, the second point, and the third point have such a positional relationship that, when at least one of the first point and the second point comes into contact with an inner peripheral surface of the attachment hole at time of the insertion of the housing into the duct, the third point is away from the inner peripheral surface of the attachment hole.

According to the present disclosure, there is also provided an air flow measuring device adapted to be attached to a duct in which air flows. The device includes a fitted part, a housing, a flow sensor, and a temperature sensor component. The fitted part is fitted into an attachment hole which is formed through a pipe wall of the duct. The housing extends from the fitted part to inside of the duct and includes a bypass flow passage which takes in a part of air flowing in the duct. The device is attached to the duct as a result of insertion of the housing into the duct through the attachment hole. The flow sensor is disposed in the bypass flow passage and configured to measure a flow rate of air. The temperature sensor component includes a terminal and a temperature detecting element. The terminal is provided for the housing. The temperature detecting element is connected to the terminal and configured to detect temperature of air flowing in the duct outside the housing. Provided that a plane that is perpendicular to a direction in which the housing extends in a vicinity of the temperature detecting element is an imaginary plane, a projection shape of the fitted part onto the imaginary plane is an ellipse; on the imaginary plane, an upstream end of the housing in a flow direction of air in the duct is a first point, a downstream end of the housing in the flow direction is a second point, and a point on the temperature sensor component that is the farthest from a center of the ellipse is a third point; an upstream end of both ends of a major axis of the ellipse in the flow direction is a fourth point, and a downstream end of both the ends of the major axis of the ellipse in the flow direction is a fifth point; an imaginary circle which passes through the fourth point and the fifth point and is tangent to the ellipse is a first imaginary circle; on the imaginary plane, the first point, the second point, and the third point are located inward of the ellipse; the first point is adjacent to the fourth point, and the second point is adjacent to the fifth point; a diameter of a second imaginary circle passing through the first point, the second point, and the third point is larger than a diameter of the first imaginary circle; and the first point, the second point, and the third point have such a positional relationship that, when at least one of the first point and the second point comes into contact with an inner peripheral surface of the attachment hole at time of the insertion of the housing into the duct, the third point is away from the inner peripheral surface of the attachment hole.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An air flow measuring device in accordance with embodiments includes a fitted part that is fitted into an attachment hole formed in a pipe wall of a duct, a housing that extends inward of the duct from the fitted part and defines a bypass flow passage, a flow sensor disposed in the bypass flow passage, and a temperature sensor component provided for the housing. The device is set at the duct as a result of insertion of the housing into the duct through the attachment hole.

When a plane perpendicular to a direction in which the housing extends, in the vicinity of a temperature detecting element of the temperature sensor component is referred to as an imaginary plane X, a projection shape of the fitted part onto the imaginary plane X is a circle (first circle) C1.

On the imaginary plane X, when an upstream end of the housing in a flow in the duct is referred to as a point (first point) A; a downstream end of the housing in the flow in the duct is referred to as a point (second point) B; and one point on the temperature sensor component that is the farthest from the center of the circle C1 is referred to as a point (third point) C, on the imaginary plane X, the points A, B are located on the circle C1 or inward of the circle C1; the point C is located inward of the circle C1; and a diameter of an imaginary circle Y passing through the points A to C is larger than a diameter of the circle C1. The points A to C have such a positional relationship that, if at least one of the point A and the point B is brought into contact with an inner peripheral surface of the attachment hole at the time of insertion of the device into the duct, the point C is away from the inner peripheral surface of the attachment hole.

(First Embodiment)

Figure 1:
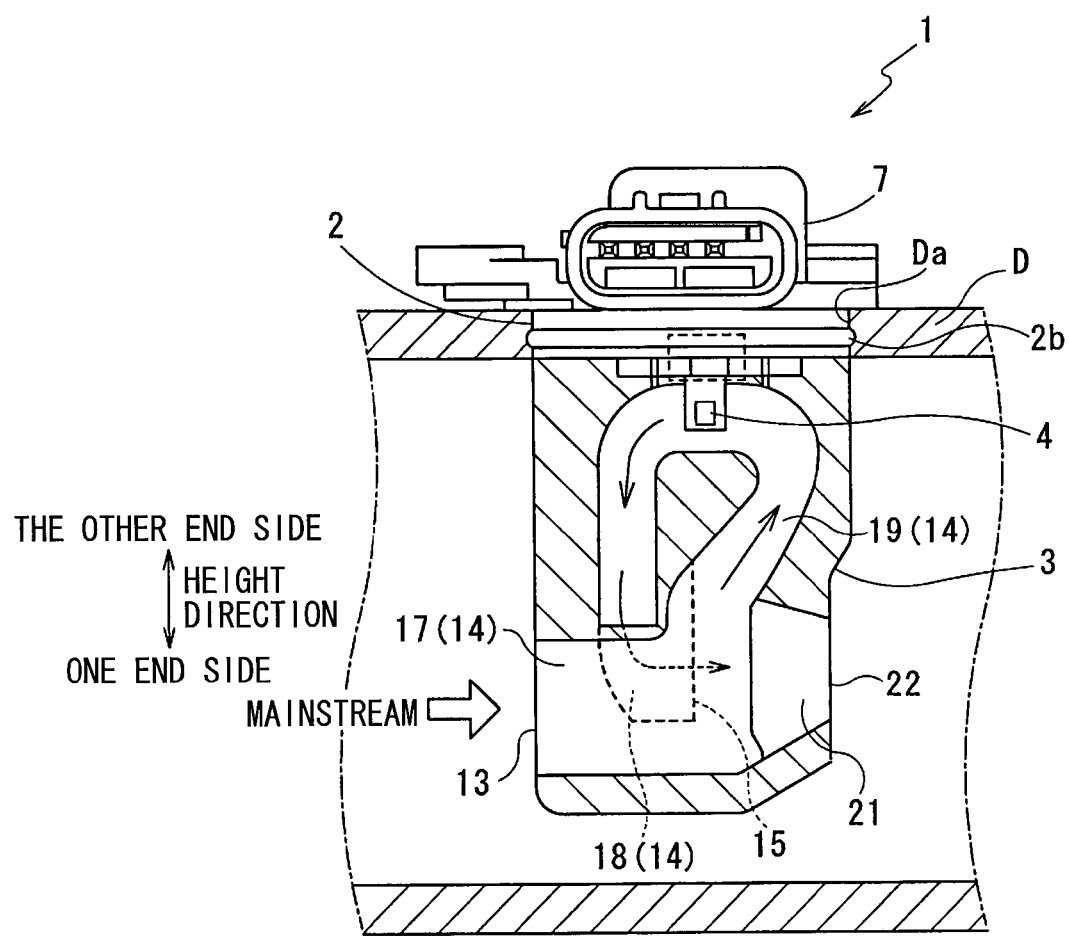
FIG. 1 is a sectional view illustrating an air flow measuring device in accordance with a first embodiment.
Figure 2A:
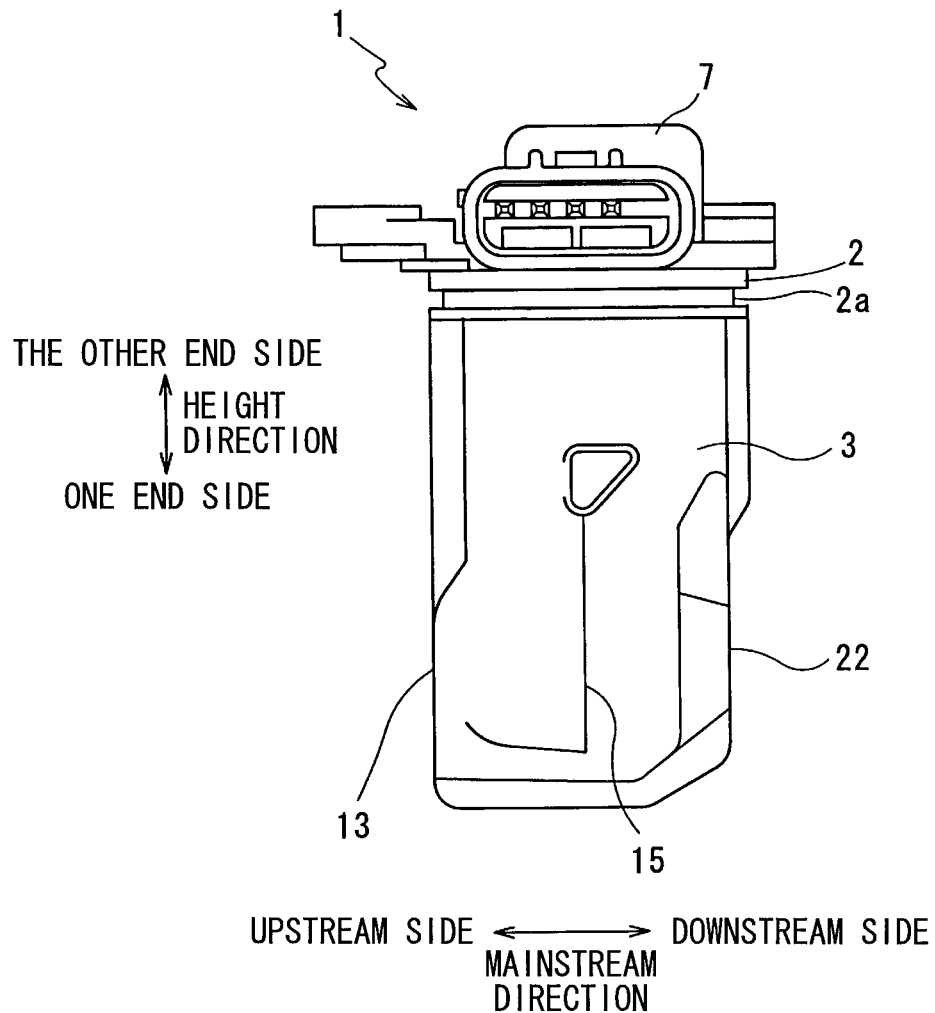
FIG. 2A is a front view illustrating the air flow measuring device of the first embodiment.
Figure 2B:
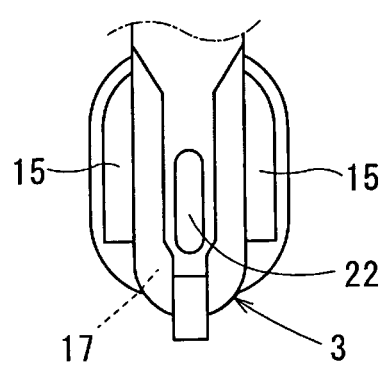
FIG. 2B is a diagram illustrating the air flow measuring device when its discharge port is viewed from a downstream side of a mainstream according to the first embodiment.

Configuration of an air flow measuring device (hereinafter referred to as a flow measuring device 1) according to a first embodiment will be described in reference to FIGS. 1 to 3. The flow measuring device 1 is, for example, an air flow meter for measuring the amount of air suctioned into an engine for an automobile, and used through its attachment to a duct D which defines an intake passage toward the engine for the automobile. An attachment hole Da opens on a pipe wall of the duct D, and the flow measuring device 1 is set as a result of its insertion into the duct D through the attachment hole Da.

The flow measuring device 1 is constituted integrally of a fitted part 2, a housing 3, a flow sensor 4, a temperature sensor component 5 and so forth, which will be described in greater detail hereinafter.

The fitted part 2 is fitted into the attachment hole Da, and includes an outer peripheral surface opposed to an inner peripheral surface of the attachment hole Da. A circumferential groove 2a is formed on this outer peripheral surface of the fitted part 2 (see FIG. 2A). A clearance between the inner peripheral surface of the attachment hole Da and the outer peripheral surface of the fitted part 2 is sealed with an O-ring 2b disposed along the circumferential groove 2a (see FIG. 1).

The housing 3 and the temperature sensor component 5 project on one end side of the fitted part 2, and a connector part 7 is provided on the other end side of the fitted part 2. In the following description, a direction in which the housing 3 of the fitted part 2 extends is referred to as a height direction. Accordingly, the "one end side" is one end side of the housing 3 in its height direction, and the "other end side" is the other end side of the housing 3 in its height direction. In addition, the one end side coincides also with a front end side of the device 1 in an insertion direction at the time of the insertion of the flow measuring device 1 into the duct D through the attachment hole Da. For this reason, with the fitted part 2 fitted into the attachment hole Da, the one end side is a direction in which the housing 3 extends toward the inside of the duct D; the housing 3 and the temperature sensor component 5 project into the interior portion of the duct D; and the connector part 7 projects outward of the duct D.

The housing 3 extends on the one end side of the fitted part 2, and defines a bypass flow passage which takes in a part of air flowing inside the duct D. The housing 3 includes an air-taking port 13 that opens toward an upstream side of a flow (i.e., mainstream) of air through the intake passage and takes in a part of intake air, an internal flow passage 14 through which the air taken from the air-taking port 13 passes, and a discharge port 15 that opens toward a downstream side of the intake passage, for returning the air taken in from the air-taking port 13 into the intake passage.

The internal flow passage 14 includes the air-taking port 13 that opens toward the upstream side of the flow (i.e., mainstream) of air through the intake passage and takes in a part of air flowing through the intake passage in its forward direction, the internal flow passage 14 through which the air taken in from the air-taking port 13 passes and which accommodates the flow sensor 4, and the discharge port 15 that opens toward the downstream side of the intake passage and returns the air taken in from the air-taking port 13 and then passing through the flow sensor 4, into the intake passage. The flow sensor 4 generates a heat transfer phenomenon between the sensor 4 and the air taken in from the air-taking port 13, and produces an output value equivalent to a mass flow rate of air.

The internal flow passage 14 includes an air-taking passage 17 that is formed continuously from the air-taking port 13 to the downstream side, a discharge passage 18 that is formed continuously from the discharge port 15 to the upstream side, and a circulation passage 19 that accommodates the flow sensor 4 and is formed around to connect together the air-taking passage 17 and the discharge passage 18.

The air-taking passage 17 is formed to extend linearly from the air-taking port 13 to the downstream side, and the flow in the air-taking passage 17 is parallel to the forward flow in the mainstream. A dust discharge passage 21 for making dust contained in the air taken in from the air-taking port 13 flow straight and for discharging the dust, is connected to a downstream end of the air-taking passage 17. A dust discharge port 22 is formed at a downstream end of the dust discharge passage 21.

The circulation passage 19 is connected to the air-taking passage 17 and the discharge passage 18 generally in a C-shaped manner, for example. The air taken in from the air-taking port 13 flows around from the air-taking passage 17 toward the discharge passage 18 along the passage 19. The flow sensor 4 is accommodated in a part of the circulation passage 19 at which air flows in a direction opposite from the flow direction in the air-taking passage 17. A flow rate of air is detected by the flow sensor 4 disposed in the circulation passage 19.

The discharge passage 18 is connected to a downstream end of the circulation passage 19, and is bent to circle around generally at a right angle from the downstream end of the circulation passage 19. The discharge port 15 is formed at a downstream end of the passage 18 (see FIGS. 1 and 2A). The discharge passage 18 branches into two parts from the upstream end so as to straddle the air-taking passage 17, and the discharge port 15 is formed at two positions on both sides of the air-taking passage 17 (see FIG. 2B).

The flow sensor 4 outputs an electrical signal (e.g., voltage signal) in accordance with a flow rate of air which flows through the bypass flow passage. Specifically, the sensor 4 includes a heater element and a temperature-sensitive element made of thin film resistors on a membrane, which is disposed on a semiconductor substrate. These elements are connected to a circuit board (not shown) incorporated into a circuit module.

Figure 3:
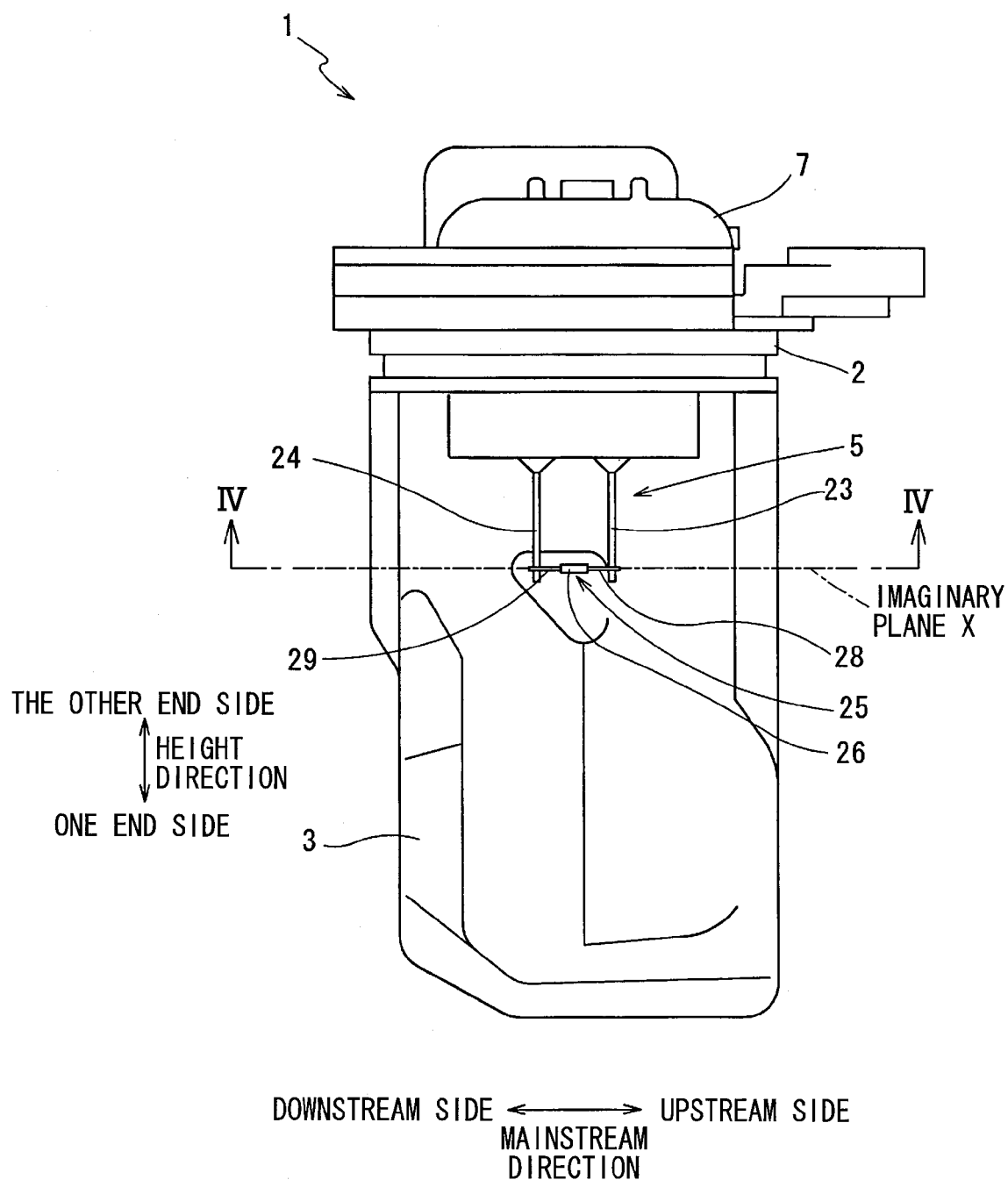
FIG. 3 is a rear view illustrating the air flow measuring device of the first embodiment.

As illustrated in FIG. 3, the temperature sensor component 5 includes a pair of terminals 23, 24 and a temperature detecting element 25 electrically connected to the terminals 23, 24. FIG. 3 is a diagram illustrating the flow measuring device in FIG. 2A when viewed from its rear side (rear view). The terminals 23, 24 are connected to the circuit board incorporated into the circuit module, and the temperature detecting element 25 is electrically connected to the circuit board through the terminals 23, 24.

The temperature detecting element 25 includes a resistor 26 and lead parts 28, 29 provided on both sides of the resistor 26. The terminals 23, 24 project on the one end side of the fitted part 2 outside the housing 3. As a result of respective welding of the lead parts 28, 29 to the terminals 23, 24, the temperature detecting element 25 is supported outside the housing 3.

As described above, the flow measuring device 1 is configured such that the housing 3 and the temperature sensor component 5 project on the one end side of the fitted part 2. The flow measuring device 1 is inserted into the attachment hole Da from the one end side, and the device 1 is set at the duct D with the fitted part 2 fitted into the attachment hole Da and the connector part 7 projecting outward of the duct D (see FIG. 1).

Figure 4:
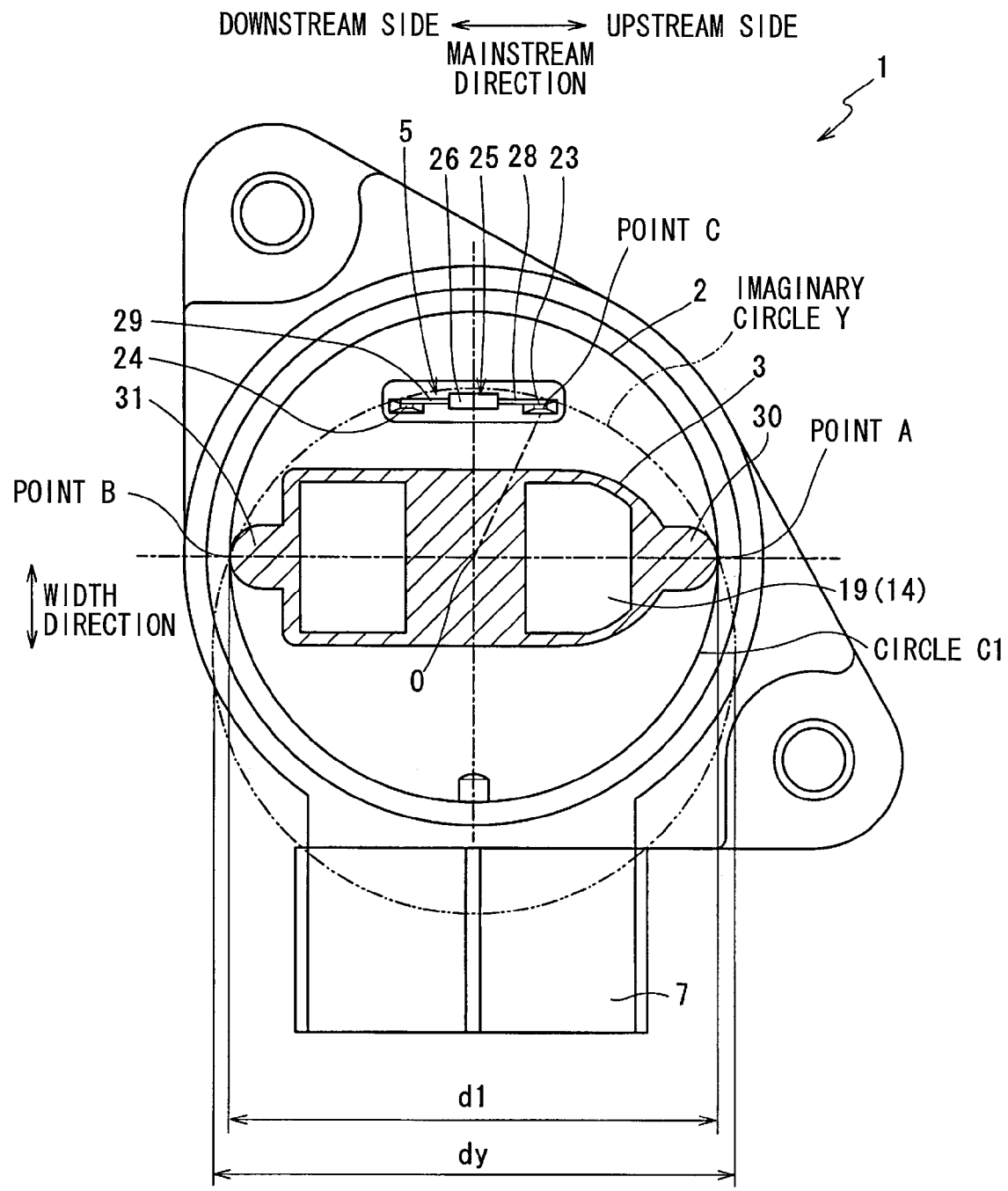
FIG. 4 is a cross-sectional view taken along a line IV-IV in FIG. 3.

Characteristics of the device 1 of the first embodiment will be described with reference to FIGS. 3 and 4. As illustrated in FIG. 3, a plane perpendicular to the height direction at a position where the temperature detecting element 25 is located is referred to as an imaginary plane X. FIG. 4 illustrates a IV-IV cross-sectional view, which is a diagram illustrating the flow measuring device 1 cut by the imaginary plane X when viewed from its one end side.

Given that a direction perpendicular to the mainstream direction and the height direction (i.e., front-rear direction with respect to a plane of paper of FIG. 4) is referred to as a width direction, the temperature sensor component 5 is located on one end side of the housing 3 in its width direction, and the two terminals 23, 24 are arranged side by side in the mainstream direction, with the lead parts 28, 29 welded on one end surfaces of the terminals 23, 24 in the width direction.

As illustrated in FIG. 4, a projection shape of the fitted part 2 onto the imaginary plane X is a circle C1 with a diameter d1. In other words, a contour shape of the fitted part 2 when the fitted part 2 is viewed from the height direction is a circle having the diameter d1. In the present embodiment, the attachment hole Da is a circular hole, and the fitted part 2 has an circular contour corresponding to the shape of the attachment hole Da. Accordingly, the contour shape of the fitted part 2 that is projected onto the imaginary plane X is also a circle. The center between the terminals 23, 24 is located on the center of the circle C1 in the mainstream direction.

As illustrated in FIG. 4, given that an upstream end of the housing 3 in the mainstream on the imaginary plane X is a point A, a downstream end of the housing 3 in the mainstream on the imaginary plane X is a point B, and that a point on the temperature sensor component 5 that is the farthest from a center point O of the circle C1 is a point C, the points A, B are located on the circle C1, and the point C is located inward of the circle C1. In the present embodiment, the center of the housing 3 in its width direction, and the center of the circle C1 in its width direction are located at the same position. The points A, B are located on both ends of the circle C1 in the mainstream direction. In a case where the temperature sensor component 5 is arranged as illustrated in FIG. 4, each end of the lead parts 28, 29 is the point on the temperature sensor component 5 that is the farthest from the center point O of the circle C1, and one point of the ends of the lead parts 28, 29 is the point C.

A positional relationship of the points A to C is set, such that a diameter dy of an imaginary circle Y passing through the points A to C is larger than the diameter d1 of the circle C1. The imaginary circle Y is, as illustrated in FIG. 4, such a circle that the point C is located on a minor arc between the point A and the point B.

In the case of such a positional relationship between the points A to C, the point A and the point B easily come into contact with the inner peripheral surface of the attachment hole Da compared to the point C. Even if at least one of the point A and the point B is in contact with the inner peripheral surface of the attachment hole Da, the point C is away from the inner peripheral surface of the attachment hole Da.

Although the plane perpendicular to the height direction at the position where there is the temperature detecting element 25 is set at the imaginary plane X, not only at this position, but on an imaginary plane perpendicular to the height direction in the entire height range in which the terminals 23, 24 extend, the points A to C have the above-described positional relationship.

In the present embodiment, a wall of the housing 3 on its upstream and downstream sides includes projection portions 30, 31 that project respectively on the upstream and downstream sides, instead of a shape that is along the internal passage shape. The point A is located at an end of the projection portion 30, and the point B is located at an end of the projection portion 31.

A sectional shape of the projection portion 30 that is perpendicular to the height direction is a shape tapered down toward its upstream end, and includes a semicircular sectional shape having a circular arc at an end of the portion 30. In addition, a cross-sectional shape of the projection portion 31 is similar to the projection portion 30, and its end includes a semicircular sectional shape.

Operation and effects of the device 1 of the first embodiment will be described. The flow measuring device 1 of the first embodiment is configured to have such a positional relationship that the points A to C are located on an inner circumferential side of the circle C1 and that the diameter dy of the imaginary circle Y passing through the points A to C is larger than the diameter dl of the circle C1. As a result of such a positional relationship between the points A to C, the device 1 has a structure whereby at the time of insertion of the device 1 into the attachment hole Da, even if the point A which is the upstream end of the housing 3 or the point B which is the downstream end of the housing 3 comes into contact with the duct D, the duct D is not in contact with the temperature sensor component 5. Therefore, because of a positional relationship between the housing 3 and the temperature sensor component 5, the contact of the temperature sensor component 5 with the duct D can be prevented. For this reason, a protection member is unnecessary, and a pressure loss of the mainstream flowing inside the duct D can be reduced.

(Second Embodiment)

Figure 5:
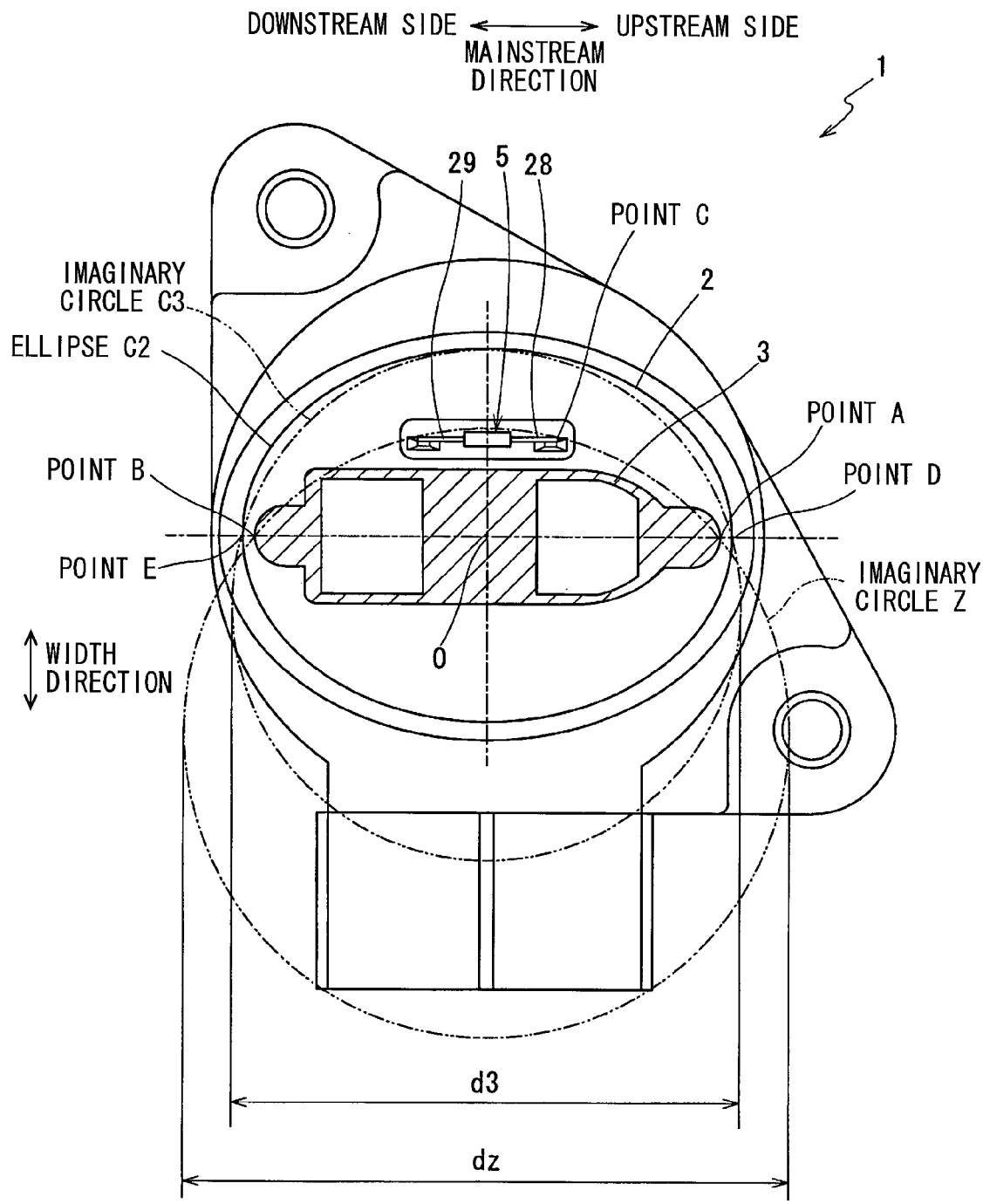
FIG. 5 is a diagram illustrating an air flow measuring device cut by an imaginary plane X when viewed from its front end side in an insertion direction of the device in accordance with a second embodiment.

A flow measuring device 1 in accordance with a second embodiment will be described in reference to FIG. 5 with a focus on the respects different from the first embodiment. As illustrated in FIG. 5, in the present embodiment, a projection shape of a fitted part 2 onto an imaginary plane X is an ellipse C2. In other words, a contour shape of the fitted part 2 when the fitted part 2 is viewed from the height direction is a shape of an ellipse. In the present embodiment, an attachment hole Da is an elliptical hole, and the fitted part 2 has an elliptical contour in accordance with the shape of the attachment hole Da. Accordingly, the contour shape of the fitted part 2 that is projected onto the imaginary plane X is also elliptical.

As illustrated in FIG. 5, given that an upstream end of a housing 3 in the mainstream on the imaginary plane X is a point A, a downstream end of the housing 3 in the mainstream on the imaginary plane X is a point B, and that a point on a temperature sensor component 5 that is the farthest from a center point O of the ellipse C2 is a point C, the points A to C are located on an inner circumferential side of the ellipse C2. In the present embodiment, the mainstream direction is a major axis direction of the ellipse C2, and the center of the housing 3 in its width direction, and the center of the ellipse C2 in its width direction are located at the same position. In a case where the temperature sensor component 5 is arranged as illustrated in FIG. 5, each end of lead parts 28, 29 is the point on the temperature sensor component 5 that is the farthest from the center point O of the ellipse C2, and one point of the ends of the lead parts 28, 29 is the point C.

Given that an upstream side of both ends of the major axis of the ellipse C2 is a point (fourth point) D and that a downstream side of both the ends of the major axis of the ellipse C2 is a point (fifth point) E, the point A is adjacent to the point D, and the point B is adjacent to the point E. In the present embodiment, since the mainstream direction coincides with the major axis direction, the points D, E are the upstream end and downstream end of the fitted part 2, respectively. The point A is located slightly on a downstream side of the point D, and the point B is located slightly on an upstream side of the point E. A length between the points A, B is approximately 90 percent of a length between the points D, E.

Given that an imaginary circle that passes through the points D, E and is in contact with (tangent to) the ellipse C2 is an imaginary circle (first imaginary circle) C3, on the imaginary plane X, the points A to C are set to have such a positional relationship that a diameter dz of an imaginary circle (second imaginary circle) Z passing through the points A to C is larger than a diameter d3 of the imaginary circle C3. The imaginary circle C3 of the present embodiment is a circle that passes through the point D and the point E and is tangent to the center of the arc between the point D and the point E.

In the case of such a positional relationship between the points A to C, the point A and the point B easily come into contact with the inner peripheral surface of the attachment hole Da compared to the point C. Even if at least one of the point A and the point B is in contact with the inner peripheral surface of the attachment hole Da, the point C is away from the inner peripheral surface of the attachment hole Da.

Owing to the above configuration of the device 1, in the second embodiment as well, similar to the first embodiment, the device 1 has a structure whereby at the time of insertion of the device 1 into the attachment hole Da, even if the point A which is the upstream end of the housing 3 or the point B which is the downstream end of the housing 3 comes into contact with the duct D, the duct D is not in contact with the temperature sensor component 5.

Figure 6A:
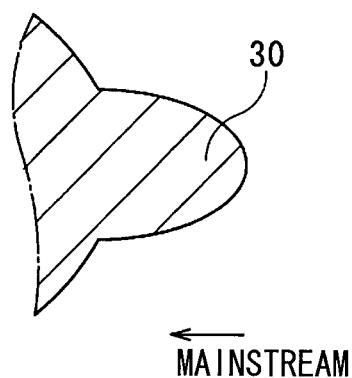
FIG. 6A is a sectional view illustrating an upstream end portion of a housing in accordance with a modification.
Figure 6B:
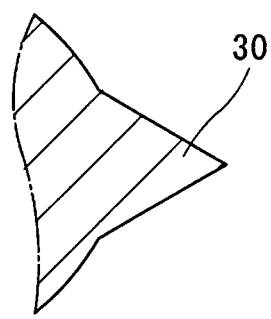
FIG. 6B is a sectional view illustrating an upstream end portion of a housing in accordance with a modification.
Figure 6C:
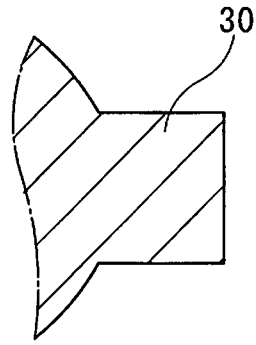
FIG. 6C is a sectional view illustrating an upstream end portion of a housing in accordance with a modification.
Figure 7:
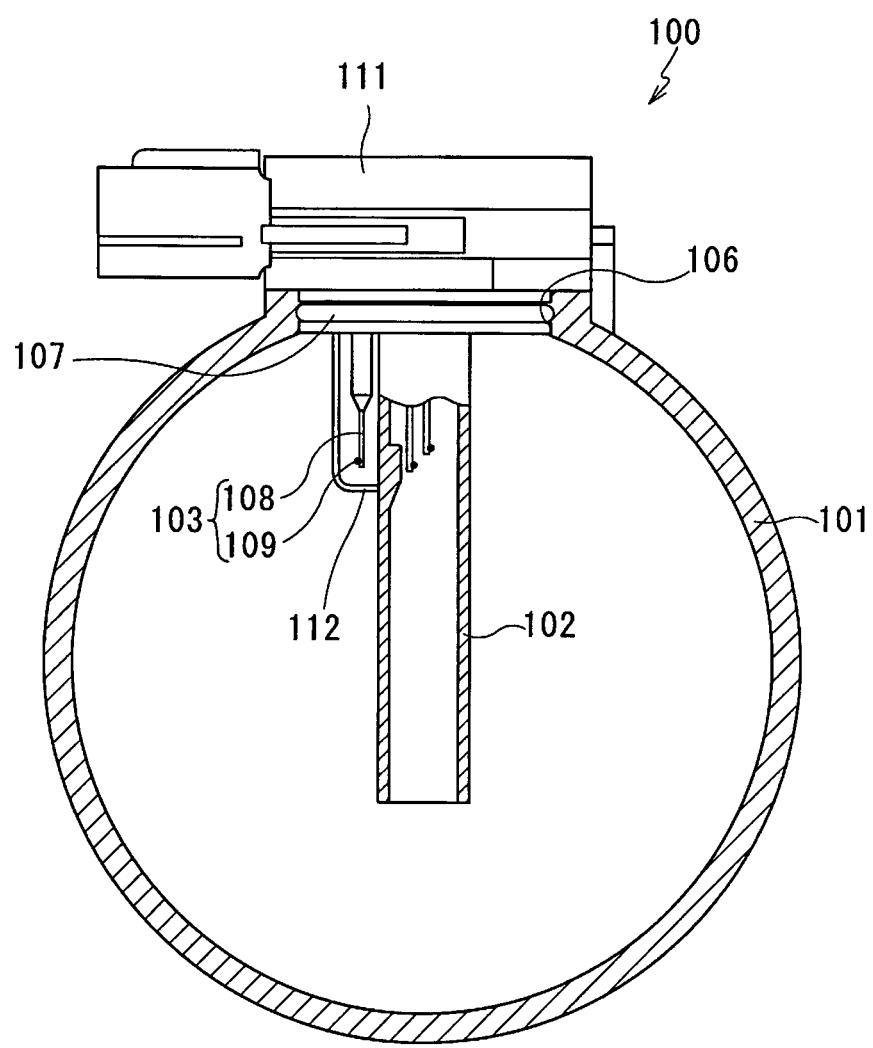
FIG. 7 is a sectional view illustrating a previously proposed air flow measuring device.

Modifications of the above embodiments will be described. In the first embodiment, the end of the cross-sectional shape of the projection portion 30 is circular. Alternatively, in addition to this, the projection portion 30 may have a cross section in a shape of an elliptical arc as illustrated in FIG. 6A or in a triangular shape as illustrated in FIG. 6B. In this case as well, similar to the first embodiment, since the projection portion 30 is tapered off toward its upstream end, the pressure loss of the mainstream can be reduced. Moreover, the projection portion 30 may have a shape whose end includes a flat surface and which is not tapered as illustrated in FIG. 6C.

In the first embodiment, although the bypass flow passage is provided by the internal flow passage 14 including the circulation passage 19, the mode of the bypass flow passage is not limited to this configuration. A mode of a bypass flow passage, which is formed from the air-taking port 13 along the forward flow in the mainstream direction without making the taken-in part of the mainstream flow around and through which the intake air entering from the air-taking port 13 flows along the forward flow in the mainstream direction so as to be discharged, may also be employed.

To sum up, the air flow measuring device 1 of the above embodiments can be described as follows.

An air flow measuring device 1 is adapted to be attached to a duct D in which air flows. The device 1 includes a fitted part 2, a housing 3, a flow sensor 4, and a temperature sensor component 5. The fitted part 2 is fitted into an attachment hole Da which is formed through a pipe wall of the duct D. The housing 3 extends from the fitted part 2 to inside of the duct D and includes a bypass flow passage 14 which takes in a part of air flowing in the duct D. The device 1 is attached to the duct D as a result of insertion of the housing 3 into the duct D through the attachment hole Da. The flow sensor 4 is disposed in the bypass flow passage 14 and configured to measure a flow rate of air. The temperature sensor component 5 includes a terminal 23, 24 and a temperature detecting element 25. The terminal 23, 24 is provided for the housing 3. The temperature detecting element 25 is connected to the terminal 23, 24 and configured to detect temperature of air flowing in the duct D outside the housing 3. Provided that a plane that is perpendicular to a direction in which the housing 3 extends in a vicinity of the temperature detecting element 25 is an imaginary plane X, a projection shape of the fitted part 2 onto the imaginary plane X is a first circle C1; on the imaginary plane X, an upstream end of the housing 3 in a flow direction of air in the duct D is a first point A, a downstream end of the housing 3 in the flow direction is a second point B, and a point on the temperature sensor component 5 that is the farthest from a center O of the first circle C1 is a third point C; on the imaginary plane X, the first point A and the second point B are located on the first circle C1 or inward of the first circle C1, and the third point C is located inward of the first circle C1; a diameter dy of an imaginary circle Y passing through the first point A, the second point B, and the third point C is larger than a diameter d1 of the first circle C1; and the first point A, the second point B, and the third point C have such a positional relationship that, when at least one of the first point A and the second point B comes into contact with an inner peripheral surface of the attachment hole Da at time of the insertion of the housing 3 into the duct D, the third point C is away from the inner peripheral surface of the attachment hole Da.

Accordingly, the device 1 has such a structure that even if the upstream and downstream ends A, B of the housing 3 come into contact with the duct D at the time of insertion of the device 1 into the attachment hole Da, the duct D is not in contact with the temperature detecting part 25. Therefore, because of a positional relationship between the housing 3 and the temperature sensor 5, the contact of the temperature sensor 5 with the duct D can be prevented. For this reason, a protection member is unnecessary, and a pressure loss of the mainstream flowing inside the duct D can be reduced.

A projection shape of the fitted part 2 onto the imaginary plane X is an ellipse C2; on the imaginary plane X, an upstream end of the housing 3 in a flow direction of air in the duct D is a first point A, a downstream end of the housing 3 in the flow direction is a second point B, and a point on the temperature sensor component 5 that is the farthest from a center O of the ellipse C2 is a third point C; an upstream end of both ends of a major axis of the ellipse C2 in the flow direction is a fourth point D, and a downstream end of both the ends of the major axis of the ellipse C2 in the flow direction is a fifth point E; an imaginary circle which passes through the fourth point D and the fifth point E and is tangent to the ellipse C2 is a first imaginary circle C3; on the imaginary plane X, the first point A, the second point B, and the third point C are located inward of the ellipse C2; the first point A is adjacent to the fourth point D, and the second point B is adjacent to the fifth point E; a diameter dz of a second imaginary circle Z passing through the first point A, the second point B, and the third point C is larger than a diameter d3 of the first imaginary circle C3; and the first point A, the second point B, and the third point C have such a positional relationship that, when at least one of the first point A and the second point B comes into contact with an inner peripheral surface of the attachment hole Da at time of the insertion of the housing 3 into the duct D, the third point C is away from the inner peripheral surface of the attachment hole Da.

Accordingly, also in the case where the projection shape of the fitted part 2 onto the imaginary plane X is elliptical, operation and effects of the device 1 similar to the first embodiment can be achieved.

An upstream end portion 30 of the housing 3 in the flow direction of air, which includes the upstream end A of the housing 3, may be formed in a triangular or arc shape in cross-section. Accordingly, a pressure loss of the mainstream can be reduced.

Additional advantages and modifications will readily occur to those skilled in the art. The invention in its broader terms is therefore not limited to the specific details, representative apparatus, and illustrative examples shown and described.

What is claimed is:

1. An air flow measuring device adapted to be attached to a duct in which air flows, the device comprising:
   a fitted part that is fitted into an attachment hole which is formed through a pipe wall of the duct;
   a housing that extends from the fitted part to inside of the duct and includes a bypass flow passage which takes in a part of air flowing in the duct, the device being attached to the duct as a result of insertion of the housing into the duct through the attachment hole;
   a flow sensor that is disposed in the bypass flow passage and configured to measure a flow rate of air; and
   a temperature sensor component that includes:
      a terminal provided for the housing; and
      a temperature detecting element connected to the terminal and configured to detect temperature of air flowing in the duct outside the housing, wherein:
   provided that a plane that is perpendicular to a direction in which the housing extends at a position where the temperature detecting element is located is an imaginary plane,
      a projection shape of the fitted part onto the imaginary plane is a first circle;
      on the imaginary plane, an upstream end of the housing in a flow direction of air in the duct is a first point, a downstream end of the housing in the flow direction is a second point, and a point on the temperature sensor component that is the farthest from a center of the first circle is a third point;
      on the imaginary plane, the first point and the second point are located on the first circle or inward of the first circle, and the third point is located inward of the first circle;
      a diameter of an imaginary circle passing through the first point, the second point, and the third point is larger than a diameter of the first circle; and
      the first point, the second point, and the third point have such a positional relationship that, when at least one of the first point and the second point comes into contact with an inner peripheral surface of the attachment hole at time of the insertion of the housing into the duct, the third point is away from the inner peripheral surface of the attachment hole; and
   an upstream end portion of the housing in the flow direction of air, which includes the upstream end of the housing, is formed in a triangular or arc shape in cross-section.

2. An air flow measuring device adapted to be attached to a duct in which air flows, the device comprising:
   a fitted part that is fitted into an attachment hole which is formed through a pipe wall of the duct;
   a housing that extends from the fitted part to inside of the duct and includes a bypass flow passage which takes in a part of air flowing in the duct, the device being attached to the duct as a result of insertion of the housing into the duct through the attachment hole;
   a flow sensor that is disposed in the bypass flow passage and configured to measure a flow rate of air; and a temperature sensor component that includes:
  a terminal provided for the housing; and
  a temperature detecting element connected to the terminal and configured to detect temperature of air flowing in the duct outside the housing, wherein:
provided that a plane that is perpendicular to a direction in which the housing extends in a vicinity of the temperature detecting element is an imaginary plane,
  a projection shape of the fitted part onto the imaginary plane is an ellipse;
  on the imaginary plane, an upstream end of the housing in a flow direction of air in the duct is a first point, a downstream end of the housing in the flow direction is a second point, and a point on the temperature sensor component that is the farthest from a center of the ellipse is a third point;
  an upstream end of both ends of a major axis of the ellipse in the flow direction is a fourth point, and a downstream end of both the ends of the major axis of the ellipse in the flow direction is a fifth point;
  an imaginary circle which passes through the fourth point and the fifth point and is tangent to the ellipse is a first imaginary circle;
  on the imaginary plane, the first point, the second point, and the third point are located inward of the ellipse;
  the first point is adjacent to the fourth point, and the second point is adjacent to the fifth point;
  a diameter of a second imaginary circle passing through the first point, the second point, and the third point is larger than a diameter of the first imaginary circle; and
  the first point, the second point, and the third point have such a positional relationship that, when at least one of the first point and the second point comes into contact with an inner peripheral surface of the attachment hole at time of the insertion of the housing into the duct, the third point is away from the inner peripheral surface of the attachment hole.

3. The air flow measuring device according to claim 2, wherein an upstream end portion of the housing in the flow direction of air, which includes the upstream end of the housing, is formed in a triangular or arc shape in cross-section.

* * * * *